Figure 1:
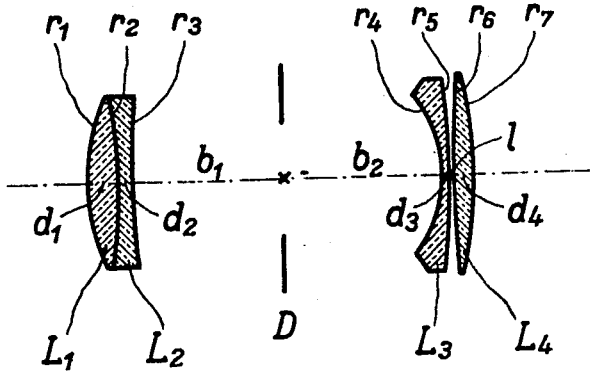

April 22, 1941.   R. RICHTER   2,239,538
PHOTOGRAPHIC TELEOBJECTIVE
Filed March 8, 1940   2 Sheets-Sheet 1

$r_1 = + 20.3$      $d_1 = 3.1$
$r_2 = - 49.8$      $d_2 = 1.2$
$r_3 = + 87.39$     $b_1 = 14.52$
                    $b_2 = 15.64$
$r_4 = - 12.5$      $d_3 = 1.0$
$r_5 = - 75.42$     $l = 0.07$
$r_6 = + 150.0$     $d_4 = 1.87$
$r_7 = - 41.95$

|        | $L_1$   | $L_2$   | $L_3$   | $L_4$   |
|--------|---------|---------|---------|---------|
| $n_d$ = | 1.56013 | 1.72825 | 1.51633 | 1.62004 |
| $\nu$ = | 48.7    | 28.3    | 64.0    | 36.3    |

Inventor:
Robert Richter $r_1 = + 21.1$
$r_2 = - 40.0$
$r_3 = - 40.2$
$r_4 = + 70.95$ $r_5 = - 13.0$
$r_6 = - 70.0$
$r_7 = \infty$
$r_8 = - 33.18$ $d_1 = 3.21$
$l_1 = 0.07$
$d_2 = 1.20$
$b_1 = 14.23$
$b_2 = 16.14$
$d_3 = 1.0$
$l_2 = 0.07$
$d_4 = 1.87$

|  | $L_1$ | $L_2$ | $L_3$ | $L_4$ |
|---|---|---|---|---|
| $n_d =$ | 1.60801 | 1.72825 | 1.60801 | 1.72825 |
| $\nu =$ | 45.0 | 28.3 | 46.2 | 28.3 |

Inventor:
Robert Richter

Patented Apr. 22, 1941

2,239,538

UNITED STATES PATENT OFFICE 2,239,538

PHOTOGRAPHIC TELEOBJECTIVE

Robert Richter, Jena, Germany, assignor to the firm Carl Zeiss, Jena, Germany

Application March 8, 1940, Serial No. 322,980
In Germany March 30, 1939

3 Claims. (Cl. 88—57)

Application has been filed in Germany March 30, 1939.

The invention relates to photographic teleobjectives, i. e., to objectives whose two principal points lie before the front lens if by the latter that particular lens is referred to which in the case of diminutions faces the object to be imaged. The object of the invention is in particular to improve those simplest kinds of teleobjectives consisting of four single lenses of which one converging and one diverging lens each form a system, viz., a positive system lying in front and a negative system lying in the rear. To obtain satisfactory definition and flatness of image with this simple four-lens form of teleobjectives at high speed the correction of distortion has been dispensed with heretofore. In case the objectives in question are to satisfy greater requirements, types consisting of more than four lenses have been adopted and the simplicity of the objectives is dispensed with though important this may very often be, as for instance in the manufacture of long-focus objectives. Four-lens teleobjectives corrected for distortion are as yet unknown.

According to the present invention it is possible also in the case of four-lens teleobjectives to considerably reduce and practically eliminate the distortion if a known lens-combination is taken where the two diverging lenses of the objective face each other, where the diverging lens of the negative system is formed by a meniscus whose hollow side faces the positive system, where the radius of the concave surface of this meniscus is numerically greater than one tenth of the focal length of the objective and where the radius of the convex surface of said meniscus is numerically greater than double the radius of the concave surface, whereby, however, the two lenses of the negative system—in deviating from the known—are separated by an air-space which takes the form of a diverging lens, but having a collective refractive power. It is advisable to make this air-lens in the negative system hollow on both sides.

The two forward lenses of the objectives according to this invention can be cemented together or can also be combined without being cemented together. Of the uncemented types one form has proved to be especially suitable for reducing the aberrations, viz., that form where the two lenses of the positive system enclose a meniscus-shaped air lens whose hollow side is turned away from the negative system and whose image-side radius of curvature is longer than the object-side radius of curvature.

In the drawings and in the following tables constructional examples of two objectives according to the invention are given, the focal lengths of the objectives being assumed in the following data to amount to 100.

1. *Constructional example (Fig. 1)*

| Radii | Thicknesses and spaces | Types of glasses | |
|---|---|---|---|
| | | $n_d$ | $\nu$ |
| $r_1 = +20.3$ | $d_1 = 3.1$ | 1.56013 | 48.7 |
| $r_2 = -49.8$ | $d_2 = 1.2$ | 1.72825 | 28.3 |
| $r_3 = +87.39$ | $b_1 = 14.52$ $b_2 = 15.64$ | | |
| $r_4 = -12.5$ | $d_3 = 1.0$ | 1.51633 | 64.0 |
| $r_5 = -75.42$ | $l = 0.07$ | | |
| $r_6 = +150.0$ | $d_4 = 1.87$ | 1.62004 | 36.3 |
| $r_7 = -41.95$ | | | |

This constructional example covers an image-field of about 30° at an aperture-ratio of 1:6.3 with corrected distortion. The distance between the front vertex of the front lens and the rear focal plane is 79.56.

Figure 2:
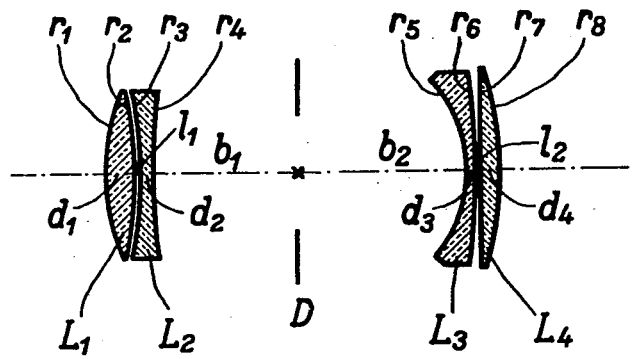

2. *Constructional example (Fig. 2)*

| Radii | Thicknesses and spaces | Types of glasses | |
|---|---|---|---|
| | | $n_d$ | $\nu$ |
| $r_1 = +21.1$ | $d_1 = 3.21$ | 1.60801 | 45.0 |
| $r_2 = -40.0$ | $l_1 = 0.07$ | | |
| $r_3 = -40.2$ | $d_2 = 1.20$ | 1.72825 | 28.3 |
| $r_4 = +70.95$ | $b_1 = 14.23$ $b_2 = 16.14$ | | |
| $r_5 = -13.0$ | $d_3 = 1.0$ | 1.60801 | 46.2 |
| $r_6 = -70.0$ | $l_2 = 0.07$ | | |
| $r_7 = \infty$ | $d_4 = 1.87$ | 1.72825 | 28.3 |
| $r_8 = -33.18$ | | | |

This constructional example likewise covers an image-field of about 30° at an aperture ratio of 1:6.3 and slight distortion. The distance between the front vertex of the front lens and the rear focal plane amounts to 79.37 in this case.

I claim:

1. In a photographic objective whose principal points lie before the front surface, the combination of a front positive and a rear negative lens system, both systems being in axial alignment and axially spaced a distance apart greater than one fifth and less than one half the focal length of the objective as a whole, each of said systems consisting of a converging and of a diverging lens, the diverging lenses of the two systems facing each other, the diverging lens of the negative system being a meniscus whose concave side faces the positive system, the radius of the hollow side of this meniscus being numerically greater than one tenth and less than one fifth of the focal length of the objective, the radius of the convex surface of this meniscus being numerically greater than double the radius of the concave surface and less than infinite, and the two lenses of the negative system being spaced apart by an air lens having the form of a diverging lens but with a converging power of refraction.

2. In an objective according to claim 1, the said air lens of the negative system being hollow on both sides.

3. In an objective according to claim 1, the two lenses of said positive system being spaced apart by an air lens having the form of a meniscus whose hollow side is turned away from the negative system and whose radius of curvature facing the image is longer than that facing the object.

ROBERT RICHTER.